United States Patent [19]

Moret et al.

[11] Patent Number: 4,894,209

[45] Date of Patent: Jan. 16, 1990

[54] PROCESS FOR OBTAINING A URANIUM-BEARING CONCENTRATE OF HIGH PURITY FROM LIQUORS CONTAMINATED WITH ZIRCONIUM

[75] Inventors: Jacques M. M. Moret, Saint Pardoux; Nicole Peyriere, Limoges; Andre L. N. Textoris, Bessines, all of France

[73] Assignee: Compagnie Generale des Matieres Nucleaires, Velizy-Villacoublay, France

[21] Appl. No.: 63,370

[22] Filed: Jun. 18, 1987

Related U.S. Application Data

[63] Continuation-in-part of Ser. No. 762,006, Aug. 2, 1985, abandoned.

[30] Foreign Application Priority Data

Aug. 2, 1984 [FR] France ................................ 84 12252

[51] Int. Cl.$^4$ ............................................. C01G 43/00
[52] U.S. Cl. ....................................... 423/15; 423/11; 423/16
[58] Field of Search ............................. 423/11, 15, 16

[56] References Cited

U.S. PATENT DOCUMENTS

| | | | |
|---|---|---|---|
| 3,093,452 | 6/1963 | Newby | 423/11 |
| 3,288,570 | 11/1966 | Henrickson | 423/6 |
| 3,510,273 | 5/1970 | Fitzhugh et al. | 423/11 |
| 3,790,658 | 2/1974 | Fox et al. | 423/18 |
| 4,405,566 | 9/1983 | Weir et al. | 423/15 |
| 4,423,013 | 12/1983 | Maurel et al. | 423/11 |
| 4,451,439 | 5/1984 | Maurel et al. | 423/11 |
| 4,524,001 | 6/1985 | Voubert | 423/11 |
| 4,675,166 | 6/1987 | Joubert | 423/11 |

FOREIGN PATENT DOCUMENTS

WO83/01793  5/1983  PCT Int'l Appl. .

*Primary Examiner*—Edward A. Miller
*Attorney, Agent, or Firm*—Larson and Taylor

[57] ABSTRACT

The invention has as its object a process for the purification of a uranium solution which is contaminated by zirconium. This process consists of bringing the pH of the solution to a value of 1 to 3, then adjusting the pH of the said solution to, and maintaining it at a value of 2.5 to 3 while raising the temperature to a value of around 30° to around 60° C. for a period sufficiently long that there occurs a selective precipitation of at least 70% of the zirconium while the uranium remains in the dissolved state.

21 Claims, 3 Drawing Sheets

PROCESS FOR OBTAINING A URANIUM-BEARING CONCENTRATE OF HIGH PURITY FROM LIQUORS CONTAMINATED WITH ZIRCONIUM

This application is a continuation-in-part of application Ser. No. 762,006, filed Aug. 2, 1985, now abandoned.

The invention relates to a purification process for uranium contaminated with zirconium, to obtain a uranium concentrate of high purity.

The invention also aims to provide a purification process for uranium contaminated by zirconium, contained particularly in uranium-bearing solutions, which may also contain carbonate, bicarbonate, sulfate and sodium ions and possibly those of phosphorus and molybdenum, these solutions being obtainable particularly from uranium-bearing liquors resulting from acid or alkaline treatment of uranium ores. The invention also aims to provide a process for the purification of uranium, particularly that in the form of solid uranates, such as sodium uranate, ammonium uranate and magnesium uranate obtained as a by-product of a process for the recovery of uranium.

Uranium ore treatment plants produce uranium concentrates containing around 70% uranium. These concentrates should meet very strict standards of purity in order to avoid problems in the later phases of refining and converting uranates to uranium hexafluoride.

One of the troublesome impurities contained in uranium-bearing ores is zirconium. Its presence is responsible for the formation of deposits which hinder the proper functioning of uranium refining and converting processes.

In addition, given that a part of the zirconium is taken up with the uranium, the purity of the uranium hexafluoride is compromised. This explains the reason why the standards concerning maximum zirconium content are so strict.

Zirconium, when contained in uranium deposits, may be found in different forms such as zircon or zirconyl salts, some of which are dissolved in the course of some of the initial treatments of the uranium concentrates.

During the different subsequent steps, the zirconium remains with the uranium and is precipitated along with it in alkaline solutions.

In U.S. Pat. No. 3 288 570 it was proposed that zirconium should be recovered from a solution of carbonates containing uranium, zirconium and molybdenum.

That process as described consists of precipitating the zirconium essentially in the form of zirconium carbonate. To do this, it is necessary to heat the solution to a temperature between 80° and 100° C. in order to transform the derivatives, particularly bicarbonates, with the solutions may contain, to carbonates. But this runs the risk of premature precipitation of significant proportions of uranium, which means that the precipitation operation must be practiced at a pH less than, or at most equal to, 10.

In addition, the control of the pH is very difficult: as indicated in the American patent, the pH should be measured at a temperature between 25° and 30° C. in order to get a correct reading, because at higher temperatures the measures are subject to considerable error, even using a temperature compensator.

As a consequence, all the drawbacks which result from the necessity of working at a temperature between 80° and 100° C. render that process industrially inapplicable.

It has also been proposed to treat solutions containing uranium, zirconium and molybdenum by a partial bicarbonate removal, followed by a treatment with $Ca(OH)_2$ to raise the pH of the solutions to around 13. This causes the uranium and zirconium to precipitate out while the molybdenum remains in solution. The solid uranium-zirconium is submitted to an acid attack down to around pH1 for dissolution. The solution thus obtained is then treated with magnesium oxide to a pH of around 7 which causes the uranium to precipitate in the form of magnesium uranate but unfortunately most of the zirconium also precipitates at the same time.

It has equally been proposed to treat alkaline solutions of zirconium-contaminated uranium by additional alkalinization of a pH between 11 and 12 and at a temperature below 60° C. and not exceeding that at which a precipitation of at least 5% by weight of the level of uranium would also be obtained.

But it has been observed that the selective precipitation of zirconium at pH 11-12, relative to uranium at these values, is particularly dependent on the level of carbonate ions in the solution.

This process will produce uranium containing around 2 to 3% by weight of zirconium but does not seem to allow to obtain uranium containing less than 2 to 3% of zirconium.

One of the aspects of the invention is to provide a process for obtaining uranium of very high purity from zirconium-contaminated uranium, the uranium obtained containing at most 0,2% of zirconium (percentage expressed in weight with respect to uranium).

Another aspect of the invention is to provide a selective separation process between uranium and zirconium from uraniferous solution contaminated by zirconium so that uranium, after it has been separated from zirconium, contains no more than 0.2% of zirconium (expressed in percentage in weight with respect to uranium) and so that zirconium, after it has been separated from uranium, does not contain more than about 1% of uranium expressed in percentage in weight with respect to the total amount of uranium.

Another aspect of the invention is to provide an industrial proces enabling to obtain, in the first execution of the process, high purity uranium from uraniferous solutions contaminated by zirconium and in which it is not necessary to restort to re-treatment of the obtained zirconium precipitate because of the very low percentage of uranium which precipitates with zirconium.

Another aspect of the invention is to provide an industrial process enabling to obtain, in the first execution of the process, high purity uranium from uraniferous solutions contaminated by zirconium and in which it is not necessary to recycle the uraniferous solution, because of the very low percentage of zirconium which remains with uranium.

Another aspect of the invention is to obtain uranium of high purity without however modifying the yield of uranium.

Another aspect of the invention is to obtain uranium of high purity without however modifying the yield of uranium.

Another aspect of the invention is to provide a process for the purification of zirconium-contaminated uranium-bearing solutions, the different steps of which are relatively simple to execute.

Another aspect of the invention is to provide a purification process for zirconium-contaminated uranium applicable to solutions, especially alkaline ones, derived from the alkaline 'attack' of uranium-bearing concentrates, as well as to re-extraction solutions, obtained particularly from the acid lixiviation of crude uranium-bearing concentrates.

Another aspect of the invention is to provide a process for the W purification of zirconium-contaminated uranium-bearing solutions, whatever the nature of the ionic species in solution, and independently of the organic matter concentration, without affecting the uranium yield.

Another aspect of the invention is to provide a process for the purification of zirconium-contaminated uranium-bearing solutions and which will not be dependent upon the concentration of carbonate ions in solution.

Another aspect of the invention is to provide a process for obtaining uranium of high purity from solutions contaminated by zirconum and phosphorus, and the different steps of which are simple to execute.

Another aspect of the invention is to provide a process for the purification of zirconium-contaminated uranium-bearing solutions which is easy to execute on an industrial scale.

Another aspect of the invention is to provide a process for the purification of zirconium-contaminated uranium, which is applicable to uranium in the form of solid uranates, such as ammonium uranate, sodium uranate and magnesium uranate obtained after a prior treatment of uranium-bearing solutions.

It has been unexpectedly discovered that by adjusting the pH of an aqueous solution containing uranium and zirconium to a value of about 2.5 to 3 and then maintaining the pH at this value while the temperature of the solution is raised to a value at least of about 30° C. for a sufficiently long time, selective precipitation of zirconium occurs while the uranium remains in solution.

The process according to the invention for the purification of a zirconium-contaminated uranium-bearing solution is characterized in that the uraniferous solution is such that the value of the weight ratio between uranium and zirconum (U/Zr) is equal or higher than about 25 and in that the uranium and zirconium are dissolved by bringing the pH of the solution which contains them to a value of 1 to 3.

The pH of the solution containing the uranium and zirconium in a dissolved state is adjusted to a value of 2.5 to 3, then maintained at this stated value while heating the solution to a temperature of at least about 30° C. for a sufficiently long period that there is selective precipitation of at least 70% by weight of the total quantity of the zirconium while the uranium remains in the dissolved state.

It has been observed that from a solution containing zirconium and uranium, in which the weight ratio U/Zr is equal or higher than about 25, uranium and zirconium being both in the dissolved state, it is possible to precipitate selectively the zirconium while the uranium remains dissolved, by adjusting the pH of the solution to a value of 2.5 to 3 and maintaining the pH at this value while heating the solution to a temperature going from at least about 30° C. for the time necessary for there to be selective precipitation of at least 70% by weight of the total quantity of zirconium.

The precipitation of at least 70% by weight of the total quantity of zirconium by using the process of the invention was completely unexpected, given that from a non-uranium-bearing solution containing zirconium, that by adjusting the pH of that solution to 2.5-3 and maintaining it at a temperature of at least about 30° C., preferably of about 30° C. to 60° C., the precipitation kinetics of zirconium are very slow and the quantity of zirconium precipitated cannot exceed 40 to 50% by weight of the total zirconium.

In order that the uranium obtained should be of high purity, at least 70% by weight of the total quantity of zirconium must be eliminated.

In general, elimination of at least 70%, even better at least 90% by weight of the total quantity of zirconium, is necessary and sufficient, on the one hand to reduce the level of zirconium to values compatible with the standards currently in force, and on the other hand to obtain high purity uranium.

The percentage of selective precipitation of zirconium relative to uranium depends essentially on three parameters, which are the pH, the time, and the temperature.

BRIEF DESCRIPTION OF THE DRAWINGS

FIG. 1 represents the variation of the percentage (by weight) of selective precipitation of zirconium as a function of time (duration) for the pHs and temperatures specified for a solution containing uranium (for example 40 to 80 g/l).

Figure 1:
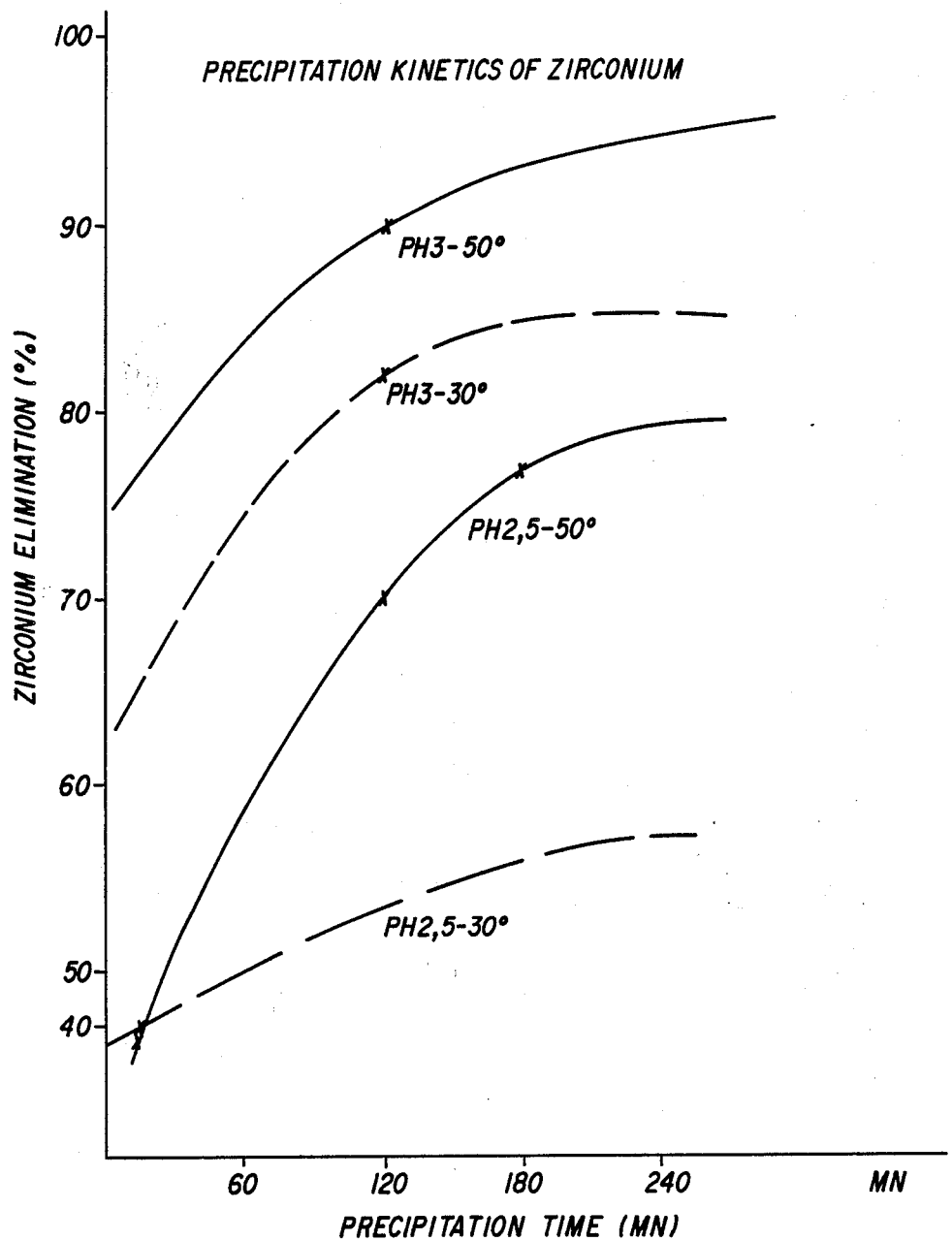
FIG. 1 shows the precipitation kinetics of zirconium.

Along the abscissa are shown the durations (expressed in minutes) during which the pH is maintained at a given value (2.5 to 3) and the ordinate gives the percentages (by weight) of zirconium precipitation.

The following elements has been observed:

at 30° C. while maintaining the pH of the solution at 2.5 for 2 hours, around 55% by weight of the total weight of the zirconium contained in the solution, is precipitated;

operating at 50° C. and maintaining the pH at 2.5 for 2 hours, around 70% by weight of the total zirconium is precipitated;

operating at 30° C. and maintaining the pH of the solution at 3 for 2 hours, around 83%, by weight of the total quantity of zirconium is precipitated;

operating at 50° C. and maintaining the pH of the solution at 3 for 2 hours, around 93% by weight of the total zirconium is precipitated It has been noted that under acid conditions, the zirconium contained in uranium-bearing solutions is susceptible to precipitation if the pH of the said solution is from 2.5 to 3 and that outside the pH range, under pH 2.5, the zirconium does not selectively precipitates and above pH 3, the amount of precipitated uranium becomes important, which necessitates a re-treatment of the zirconium precipitate to recover uranium.

Furthermore, the kinetic law which governs this selective precipitation is such that if operating at ambient temperature even while maintaining for a very long time the pH at 2.5-3, the percentage of zirconium precipitation attains a limit value which is less than 70% by weight of the total quantity of zirconium, which is not sufficient to obtain uranium of high purity.

It has been noted that for a given pH value going from 2.5 to 3, heating the solution to a value of at least about 30° C., preferably from about 30° to 60° C., more advantageously from 40° to 60° C., the selective precipitation of at least 70% by weight of zirconium occurs and the duration of this precipitation is entirely compatible with industrial requirements. The temperature of 60° C. is not critical, for this given pH value, and if heated beyond 60° C. the precipitation reaction is faster. But from an industrial point of view, optimizing the regulation of the parameters would tend toward a temperature not exceeding around 60° C. inasmuch as the precipitation reaction still occurs over an industrially acceptable period, which is to say from about 2 to about 4 hours.

However, for a given pH of between 2.5 and 3, it is possible to set the corresponding temperature to between about 30° and about 60° 1 C. in order that the duration of time necessary for the precipitation of a maximal proportion of zirconium should be from around 2 hours to around 4 hours.

For a temperature under 30° C. and for a given pH of between 2.5 and 3, the kinetics are slow and there is an uncomplete dissolution of uranium and a loss in uranium.

In practice, the parameter pair, pH and temperature, are arranged such that the maximal selective precipitation of zirconium should have occured by the end of around 2 hours.

As a practical matter concerning the selection of the pH-temperature pair, the pH is generally the privileged parameter with the temperature chosen as a function of it.

It is preferable to set the pH of the solution for 3 for around 2 hours, while heating the solution to around 50° C.

Given that the selective zirconium precipitation reaction is accomplished at a temperature generally not exceeding around 60° C., it is possible to control and check the pH extremly precisely, either continuously or at short intervals of time, as the case may be and these measures may be made with standard industrial equipment.

Figure 2:
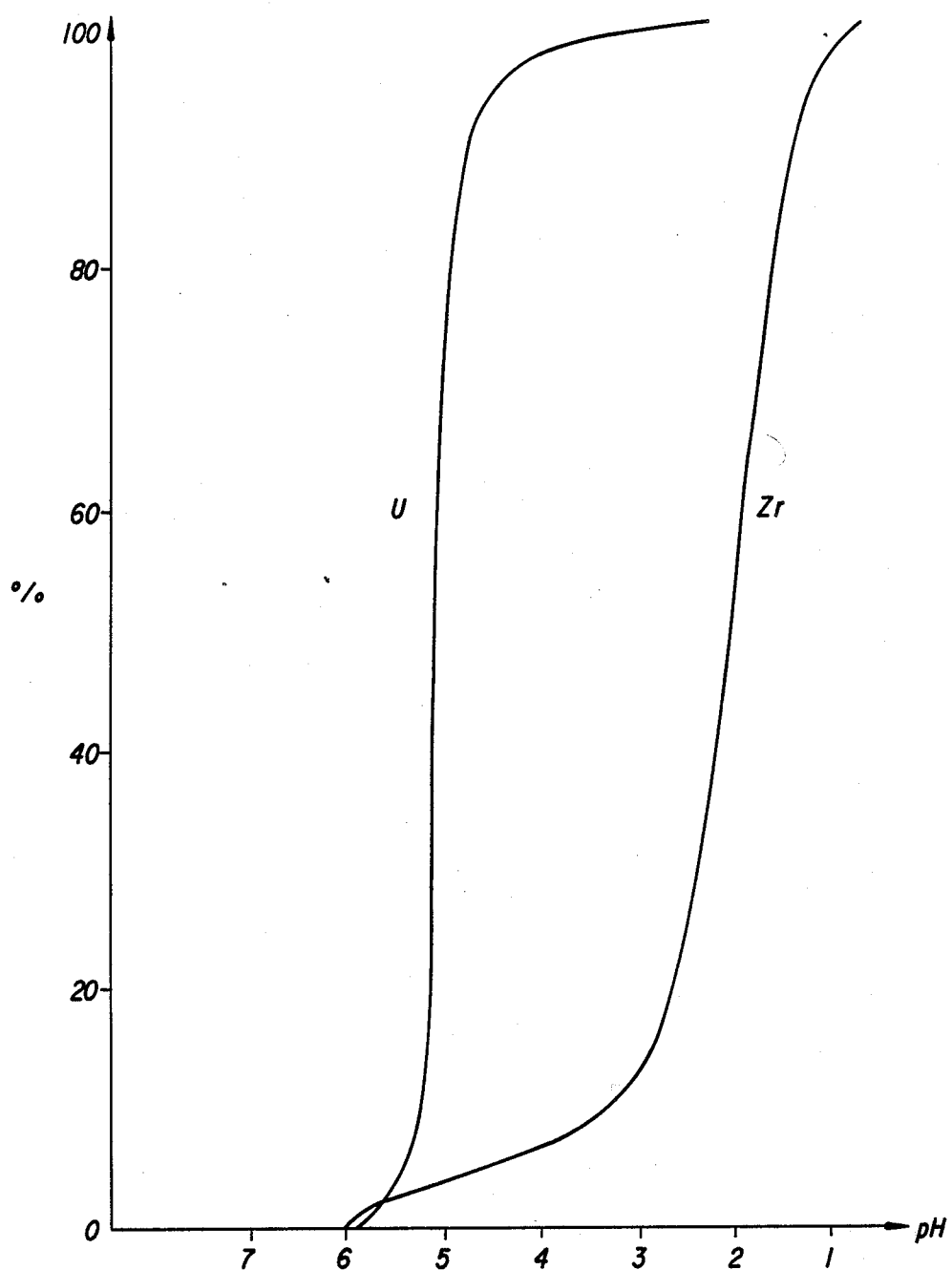
FIG. 2 shows the solubility characteristics of zirconium and uranium.

FIGS. 2 represents the variation of the percentage of solubilization expressed in percentage in weight (ordinates) with respect to pH (abscissa) respectively for uranium and zirconium at the temperature of 30° C. in a solution containing uranium (for example 0.5 to 1.2 g/l).

It is observed that for the value of pH 3, about 87.6% of zirconium are precipitated whereas only 0.4% of uranium precipitates, which means that about 99.6% of uranium remain dissolved. At pH 4, the amount of precipitated uranium is 2.4%, which means that 2.4% of uranium are precipitated with zirconium which is economically inacceptable without adding an additional step to retreat the zirconum precipitate in order to recover uranium.

The choice of pH in the range of 2.5 to 3 enables to achieve the best compromise between, on the one hand, the minimum loss economically acceptable of uranium with respect to total uranium and, on the other hand, the sufficient elimination of zirconium to decontaminate uranium in order to obtain high purity uranium.

Generally, the solution to be treated, containing uranium which is contaminated by zirconium, is, before the selective precipitation of zirconium step, at a pH greater than 3 and may even have a pH value such that the uranium and the zirconium are both in a completely or partially undissolved state. So, in order to dissolve uranium and zirconium, there are two methods.

According to a first method, the solution may be acidified to a value of 1 to 1.5 in order to dissolve the zirconium and the totality of the uranium. This acidification is accomplished by the addition of acid, particularly sulfuric acid.

Then the pH is adjusted to a value of 2.5 to 3 by the addition of a base, particularly sodium hydroxide.

The concentration of the base utilized varies from around 200 to around 500 g/l. A lye solution of 400 g/l concentration may advantageously be used.

According to a second method, the solution containing the uranium and zirconium may be directly acidified to a pH value of 2.5 to 3 by the appropriate quantity of acid. For this, hydrochloric or nitric acid could be used, but sulfuric acid is advantageously used.

In each of these 2 methods, just presented, fairly concentrated sulfuric acid is used by preference, to avoid too great dilutions.

The sulfuric acid utilized is for example, the same as that classically used in industry, the concentrations of which vary from 92 to 98%, for example 93%.

As a matter of practice, the inlet pump for the acid serving to acidify the solutions, and the inlet pump for the base serving, if necessary, to raise the pH of the solutions, are controlled through a pH meter and the pH may be regulated with no difficulty by units of 0.1 on the pH scale.

During the operation of the selective precipitation of zirconium, the precipitate which forms will hereafter be designated as S2. The texture of this precipitate is extremely fine, constituted essentially of zirconium (from around 5 to around 12%) and containing a very small proportion of the total uranium content (equal to, or less than about 1%).

The zirconium precipitate formed includes particularly zirconium hydroxide, and may equally contain some zirconates.

According to a preferred embodiment of the invention, the process for the purification of a zirconium-contaminated uranium-bearing solution is characterized in that the uraniferous solution is such that the value of the weight ratio between uranium and zirconium (U/Zr) is equal or higher than about 25 and in that the uranium and zirconium are dissolved by bringing the pH of the solution which contains them to a value going from 1 to 3, then adjusting the pH of the said solution containing the uranium and zirconium in a dissolved state, to a value of 2.5 to 3, then maintaining the pH at this stated value while heating the solution to temperature of at least about 30° C. for a sufficiently long period that there is selective precipitation of at least 70% by weight of the total quantity of the zirconium while the uranium remains in the dissolved state, the amount of uranium remaining in the dissolved state representing at least about 99% of the total amount of uranium.

As to uranium decontaminated from zirconium, the separation between uranium and zirconium accounts for a loss in uranium at most equal to about 1%, with respect to the amount of dissolved uranium, said loss resulting from the fact that a very low part of uranium precipitates with zirconium.

Due to the fact that the solubilization of uranium is practically total, it can be considered that the separation between uranium and zirconium accounts for a loss in uranium at most equal to about 1% with respect to the total amount of uranium.

The process according to the invention may advantageously be applied to solutions containing, other than zirconium-contaminated uranium, phosphorus.

One embodiment of the process for the purification of an aqueous solution of uranium contaminated by zirconium and by phosphorus, is characterized in that the uranium, zirconium, and phosphorus are dissolved by bringing the pH of the solution to a value of 1 to 3, then adjusting the pH of the said solution containing uranium, zirconium, and phosphorus in a dissolved state, to a value of 2.5 to 3, then maintaining the pH at this aforesaid value while heating the solution to a temperature of at least about 30° C. for a sufficiently long time that selective precipitation of at least 70% by weight of the total quantity of zirconium and of phosphorus occurs, while the uranium remains in the dissolved state.

It has been observed that from a solution containing uranium, zirconium and phosphorus in the dissolved state, it is possible to selectively precipitate the zirconium and the phosphorus, while the uranium remains in the dissolved state, by adjusting the pH of the solution to a value of 2.5 to 3, maintaining the pH at this value and heating the solution to a temperature going from at least about 30° C. for the amount of time necessary for the selective precipitation of at least 70% of the zirconium and of the phosphorus, expressed in percentage by weight relative to the total quantity of phosphorus and of zirconium, to occur.

According to a preferred embodiment of the process of the invention, the operating temperature is advantageously from about 40° to about 60° C., particularly of about 50° C.

According to a preferred embodiment of the invention, the pH is maintained at 2.5–3 at a temperature of about 40° to about 60° C. for a period sufficiently long that there is precipitation of at least 90% of the total quantity of the zirconium and of the phosphorus.

The precipitate obtained from this operation will hereinafter be designated by S2. It is constituted essentially of zirconium and phosphorus, principally in the form of zirconyl phosphate, zirconium hydroxide and may equally contain some zirconates. The precipitate S2 contains a small quantity of uranium.

When the reaction is terminated, the precipitate S2 is separated from the solution which will be designated in what follows as solution C. Given the fineness of the precipitate, the solid may be separated from the liquid either by centrifugation, by a pre layered filter, or by any other appropriate technique.

Uranium-bearing solutions submitted to the process according to the invention generally contain sulfate ions since the uranium and zirconium are dissolved essentially as uranyl sulfate and zirconyl sulfate respectively.

Uranium-bearing solutions subjected to the process according to the invention are preferably practically exempt from carbonate ions, because it is advantageous to remove the bicarbonate from the solutions for reasons which will be discussed later.

Uranium-bearing solutions subjected to the process of the invention may contain sodium ions, particularly:

in the case where the pH of the solutions to be treated has been first brought to a value of 1–1.5 in order to totally dissolve the uranium and then is adjusted to the value for the selective precipitation of zirconium, that is, pH 2.5–3, by the addition of NaOH, as well as in the case where the solutions to be treated are derived from initial solutions containing uranium in the form of uranyl sodium tricarbonate.

The uranium-bearing solutions contaminated by zirconium may be derived from aqueous molybdenum containing solutions which besides uranium, zirconium and molybdenum may also contain phosphorus.

In the case of such a molybdenum containing solution, a preferred embodiment of the process according to the invention includes:

obtaining a slurry from the precipitation of the uranium by bringing the pH of the molybdenum containing solution containing uranium, zirconium, molybdenum and possibly phosphorus to a value of 11.5 to 11.8 by the addition of a base, with the zirconium equally precipitating out, as well as the phosphorus, if any, while, however the molybdenum remains in solution;

the liquid-solid separation of this slurry to obtain, on the one hand, a precipitate designated hereafter as S1, containing essentially uranium, zirconium and possibly phosphorus, and, on the other hand, an effluent solution designated hereinafter as solution B;

the dissolving of precipitate S1 by adding acid, particularly sulfuric to reach a pH of 1 to 3;

the production of a slurry from the selective precipitation of zirconium and possibly phosphorus by adjusting and maintaining the pH of the solution to a value of 2.5–3 and raising the temperature from at least about 30° C. for a sufficiently long period of time that at least 70% of the zirconium and of the phosphorus, if any, are selectively precipitated;

the liquid-solid separation of this slurry to obtain, first, a precipitate hereafter designated as solid S2, constituted essentially of zirconium, and phosphorus, if any, and, second, an effluent solution containing the uranium, and referred to hereafter as solution C.

In the embodiment of the process according to the invention, the uranium and zirconium precipitation step is carried out at a pH of 11.5–11.8, preferably at a pH in the neighborhood of 11.7, by the addition of sodium hydroxide, because the use of Ca(OH)$_2$ is likely to cause the formation of unwanted deposits in the equipment.

The uranium precipitates essentially in the form of an hydrated oxide or of sodium diuranate, according to the final quantity of excess sodium hydroxide, and the zirconium essentially in the form of zirconium hydroxide.

The uranium precipitation reaction may be written as follows:

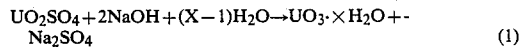

$$UO_2SO_4 + 2NaOH + (X-1)H_2O \rightarrow UO_3 \cdot XH_2O + Na_2SO_4 \quad (1)$$

X varying from 0 to 2:

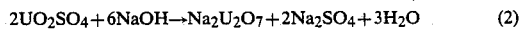

$$2UO_2SO_4 + 6NaOH \rightarrow Na_2U_2O_7 + 2Na_2SO_4 + 3H_2O \quad (2)$$

In the execution of the process according to the invention, given that it is carried out with a limited excess of sodium hydroxide, it is predominantly reaction (1) which takes place, and X, then, is generally equal to, or less than 1.

To be clear, the sodium hydroxide used is a lye solution of a concentration of around 200 to around 500 g/l, preferably of around 400 g/l.

The process according to the invention may equally be applied to aqueous uranium-bearing solutions contaminated by zirconium and possibly phosphorus, such solutions being derived from initial molybdenum containing solutions which contained uranium, zirconium and possibly phosphorus, molybdenum, organic matter, and ions of sodium, carbonate, bicarbonate and sulfate, and from which bicarbonate is selectively removed.

In the case of such an initial molybdenum containing solution, referred to hereafter as solution A, a preferred embodiment of the process according to the invention includes:
- the essentially total prior removal of bicarbonate from initial solution A, with the aid of an acid to obtain a solution practically free of carbonate, hereafter referred to as A bis;
- the production of a slurry from the precipitation of uranium by bringing the pH of the solution Abis to a value of 11.5 to 11.8 by the addition of a base, while the zirconium and the phosphorus, if present, also precipitate but while the molybdenum remains dissolved;
- the liquid-solid separation of this slurry giving: on the one hand, a precipitate designated hereafter as S1 containing essentially uranium, zirconium and phosphorus, if any; and on the other hand, an effluent solution designated hereafter as solution B;
- the re-dissolving of precipitate S1 by the addition of acid, particularly sulfuric, down to a pH of 1–3.
- the production of another slurry by the selective precipitation of zirconium and of phosphorus, if present, by adjusting and/or maintaining the pH of the solution at a value of 2.5–3 and raising the temperature from at least about 30° C. for a sufficiently long time that at least 70% of the zirconium and the phosphorus, if any, precipitate;
- the liquid-solid separation of this slurry to obtain, on the one hand, a precipitate hereafter designated S2 constituted essentially of zirconium and possibly phosphorus (if any); and on the other hand an effluent solution containing uranium and referred to hereafter as solution C.

In this embodiment of the process according to the invention, the bicarbonate removal is generally accomplished by bringing the pH of the initial moylbdenum containing solution to a value of around 4.5 to 5.2 and preferably of around 5.

This bicarbonate removal is accomplished preferably by the addition of sulfuric acid, which also brings about the destruction of organic matter constituted particularly of organic acids of the type of those which are designated as humic acids or fluvic acids.

By a practically total bicarbonate removal, about at least 90 to 95% by weight of the carbonates and bicarbonates, expressed in relation to $CO_2$, are eliminated.

This total bicarbonate removal, which leads to the quasi-total elimination of carbonate and bicarbonate ions offers the advantage of permitting, at a later stage, the precipitation of uranium and zirconium by a base, to add just the quantity of such said base, necessary and sufficient to precipitate the uranium and zirconium but not for the neutralization of the carbonate and bicarbonate ions since the solution should by now be practically free of them.

The solutions to be treated by the process conforming to the invention may also contain silicon as $SiO_2$ of from around 0 to around 1 g/l of $SiO_2$.

Typically, a solution to be treated by the process of the invention and containing uranium contaminated by zirconium and possibly phosphorus, contains, after solubilization of the uranium, zirconium and phosphorus (if any), and just before the selection precipitation of zirconium (and possibly phosphorus):
- from about 30 to about 80 g/l of uranium, particularly from about 40 to about 60 g/l uranium;
- from about 1 to about 3 g/l of zirconium, particularly from about 1.5 to about 2 g/l zirconium;
- from about 0 to about 1 g/l of phosphorus;
- from about 10 to about 50 g/l $SO_4^{--}$ ions;
- from about 5 to about 20 g/l $Na^+$ ions;
- from about 0.5 to about 1.2 g/l total organic carbon;
- from about 0 to about 0.1 g/l $CO_2$; and
- from about 0 to about 1 g/l $SiO_2$;

Remember that by convention, the effluent containing dissolved uranium was designated as solution C, this effluent being obtained after zirconium precipitation and the liquid-solid separation. The solution C contains from about 20 to about 10 mg/l of zirconium.

A preferred embodiment of the process of the invention includes the additional step of obtaining the uranium from the liquor C defined above, in the form of a uranium peroxide precipitate by treating this liquor C with hydrogen peroxide.

The formula for the corresponding chemical reaction is the following:

$$UO_2^{++} + H_2O_2 + xH_2O \rightarrow UO_4 \cdot xH_2O + 2H^+$$

x varying from 1 to 3.

When the uranium of liquor C is in the form of a sulfate, the formula for the reaction becomes:

$$UO_2SO_4 + H_2O_2 + xH_2O \rightarrow UO_4 \cdot xH_2O + H_2SO_4$$

x varying form 1 to 3.

The hydrogen peroxide of choice has a concentration of from around 300 to around 500 g/l.

The precipitation of uranium peroxide takes place under pH conditions of 3 to 4.

Now, given that the precipitation reaction of uranium to uranium peroxide lowers the pH of the reaction medium because acid is formed, it is necessary to regulate the pH and maintain it at a value of 3–4 by the addition of a base, particularly sodium hydroxide.

The control of the pH by the base is accomplished, for example, by using sodium hydroxide of a concentration 100 to 400 g/l.

According to one variant of the process according to the invention, instead of in the form of uranium peroxide, the uranium may be obtained from solution C as defined above, in the form of ammonium uranate or magnesium uranate.

This variant may be used in the case where liquor C contains little molybdenum or organic matter.

The corresponding equations may be written:

$$2UO_2SO_4 + 6NH_4OH \rightarrow U_2O_7(NH_4)_2 + 2(NH_4)_2SO_4 + 3H_2O$$

$$2UO_2SO_4 + 3MgO + 3H_2O \rightarrow U_2O_7Mg + 2MgSO_4 + 3H_2O$$

The uranium precipitate thus obtained is then decanted, filtered, washed and dried to give a uranium-bearing concentrate, S3.

Another preferred embodiment of the process according to the invention includes the additional step of dissolving the precipitated solid S2 (containing essentially zirconium) with an acid, notably sulfuric acid, at a pH between 1.5 to 2.5. The reaction time is from around 30 minutes to around 2 hours. It takes place at ambiant temperature and re-dissolves more than 90% of the uranium retained in the precipitate S2. The solid residue corresponding to that part of S2 which remains undissolved is removed by filtration. The liquid effluent resulting from this rsolubilization of the uranium, hereinafter designated as solution E, may be recycled into the process.

Other characteristics of the invention will appear in the course of the description which follows.

Typical initial solutions which could be subjected to the process according to the invention, any of which hereafter referred to as solution A, could come from liquors derived from the initial 'alkaline attack' of the crude uranium-bearing ores.

These 'A-solutions' have the following average composition:
U—from about 1 to about 5 g/l
Mo—from about 0 to about 1 g/l, particularly from about 50 to about 500 mg/l
Zr—from about 0 to about 0.1 g/l, particularly from about 40 to about 100 mg/l
total organic carbon (corresponding to the organic compounds): content lower than about 2 g/l, particularly comprised from about 0.8 to about 1.2 g/l
$Na^+$—from around 13 to around 18 g/l
$CO_3^{--}$ around 1.5 g/l
$HCO_3^-$—from about 10 to about 20 g/l
$SO_4^{--}$—from about 16 to about 20 g/l
$NaSO_4$—from about 25 to about 30 g/l
$Na_2CO_3$—from about 0 to about 3 g/l
$NaHCO_3$—from about 15 to about 25 g/l
U/Zr (in weight) higher or equal to about 25

In these solutions, the uranium may be present in the form of uranyl sodium tricarbonate.

The solutions A are first "de-bicarbonated" with the aid of sulfuric acid at a pH of about 4.5 and 5.2, preferably around 5.

After bicarbonate removal the level of sulfate ions has increased relative to that of the "initial" solution A while the levels for organic matter and carbonate and bicarbonate ions have decreased.

The solutions obtained after bicarbonate removal from solutions A will hereafter be designated as solution Abis.

The average composition of such solutions Abis is as follows:
U from about 1 to about 5 g/l
Mo from about 0 to about 1 g/l
Zr from about 0 to about 0.1 g/l
total organic carbon less than 0.2 g/l
residual $CO_2$ less than 0.1 g/l
$Na^+$ from about 13 to about 18 g/l
$SO_4^{--}$ from about 30 to about 60 g/l In this solution Abis, the uranium is found essentially as $UO_2SO_4$ and the zirconium in the form of $ZrOSO_4$.

Next, the uranium and zirconium contained in the solution Abis are precipitated by bringing the pH of this solution to a value of around 11.7 by the addition of sodium hydroxide.

The chemical reactions corresponding to the addition of NaOH may be written:

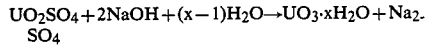

x varying from 1 to 3:

$H_2O$, $CO_2 + 2NaOH \rightarrow Na_2CO_3 + 2H_2O$ $H_2MoO_4 + 2NaOH \rightarrow Na_2MoO_4 + 2H_2O$ $H_2SO_4 + 2NaOH \rightarrow Na_2SO_4 + 2H_2O$ $ZrOSO_4 + 2NaOH \rightarrow ZrO(OH)_2 \downarrow + Na_2SO_4$ The duration of this reaction is from 0.5 to 1.5 hours. The temperature is between around 20° to around 60° C. and the pH of the slurry which is obtained is about 11.5 to about 11.8 and more generally about 11.7.

From the liquid-solid separation of this slurry, is obtained effluent solution B, the composition of which is as follows:
uranium: less than about 5 mg/l
molybdenum: from about 0 to about 1 g/l
zirconium: less than about 10 mg/l
total organic carbon: less than about 0.2 g/l
residual $CO_2$: less than about 0.1 g/l and a precipitate S1 essentially constituted of uranium and zirconium.

The average composition of solid S1 is as follows:
uranium: from about 40% to about 70%
zirconium: from about 0 to about 3%
total organic carbon: from about 0 to about 2%
U/Zr (in weight) higher or equal to about 25.

In addition, this precipitate contains as permeants, sodium sulfate and traces of molybdenum (less than 5%).

This precipitate S1 is retreated by sulfuric acid down to a pH of 2.5 according to the reactions:

$UO_3 \cdot xH_2O + H_2SO_4 \rightarrow UO_2SO_4 + (x-1)H_2O$ x varying from 1 to 3:

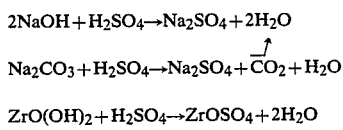

$ZrO(OH)_2 + H_2SO_4 \rightarrow ZrOSO_4 + 2H_2O$

The dissolution of the uranium takes place at pH 5 to pH 2.5.

At this stage, the composition of the solution is the following:
uranium:
from about 30 to about 80 g/l particularly
from about 40 to about 60 g/l,
Zr:
from about 1 to about 3 g/l, particularly
from about 1.5 to about 2 g/l,
$SO_4$:
from about 10 to about 50 g/l
total organic carbon: 0.5 to 1.2 g/l.

Then, if the temperature is raised from 40° to 60° C. for 2 to 4 hours, and if the pH is maintained at a value of 2.5–3 and more generally 3, at least 90% of the zirconium (expressed in weight relative to the total quantity of zirconium) precipitates in the form of $ZrO(OH)_2$ while at most 10% of the zirconium remains in the dissolved state as $ZrOSO_4$. This may be interpreted by the following reaction:

$$2ZrOSO_4 \text{ (2 to 4 hours at 40 to 60° C.)} \longrightarrow$$
$$ZrO(OH)_2 + ZrOSO_4 + H_2SO_4$$
$$(90\%) \quad\quad (10\%)$$

As sulfuric acid is formed with a consequent acidification of the solution, it is necessary, to maintain the pH at a value of 2.5–3, to control the addition of sulfuric acid.

It is equally possible, to totally dissolve the uranium, to bring the pH of the solution down to 1–1.5 then to increase its value to 2.5–3 in order to selectively precipitate the zirconium.

At pH 2.5–3 the zirconium precipitates and the reactions corresponding to its selective precipitation may be written:

$$3ZrOSO_4 + 4NaOH \rightarrow 2ZrO(OH)_2 + ZrOSO_4 + 2Na_2SO_4$$

$$ZrOSO_4 \text{(2 to 4 hours, 40° to 60° C.)} \rightarrow Zr(OH)_2 + ZrOSO_4 + H_2SO_4$$

Once again, the solution is acidified in the course of the precipitation of zirconium and consequently it is necessary to add base, notably sodium hydroxide, to maintain the pH at 2.5–3.

The precipitate constituted essentially of zirconium hydroxide will be designated as S2. It is recovered by filtration. Apart from zirconium, it contains a very small proportion of the total uranium (less than 1%) and a certain fraction of the organic matter contained in liquor A (less than 2%).

The effluent solution containing the uranium is designated as solution C. It contains from about 30 to about 80 g/l of uranium.

To extract the uranium from this solution C, hydrogen peroxide may be added to precipitate a uranium peroxide according to the equation:

$$UO_2SO_4 + H_2O_2 + xH_2O \rightarrow UO_4 \cdot xH_2O + H_2SO_4$$

x varying from 1 to 3.

This reaction lowers the pH of the solution which is controlled by adding base, notably sodium hydroxide to maintain the pH at a value between 3 and 4.

The liquid is separated from the solid to collect the precipitate which is then decanted, filtered, washed, and dried to give the uranium-bearing concentrate, S3, whose characteristics are the following:

| uranium: | from around 65 to 73% |
|---|---|
| molybdenum/uranium | less than around 0.1% |
| zirconium/uranium | 0.2% |
| total organic carbon | 0.1% |

The solution resulting from this aforesaid liquid-solid separation is called liquor D.

The molybdenum and the organic matter present in solution C remain in solution and are found again in solution D. If liquor C contains little molybdenum or organic matter, it is equally possible to precipitate ammonium uranate or magnesium uranate.

With regard to the precipitate constituted essentially of zirconium hydroxide, designated as S2, it has an extremely fine texture and the liquid-solid separation should be done by centrifugation, by the use of a pre-layered filter or by any other appropriate means.

The precipitate S2 resulting from the liquid-solid separation after recovery of the pre-concentrate may be dissolved in sulfuric acid at a pH going from 1.5 to 2.5. The duration of this reaction is around 30 minutes to around 2 hours. It is accomplished at ambiant temperature. It is possible under these conditions to re-dissolve over 90% of the uranium retained in the precipitate and to recycle it back into the process (liquor E). The residue S4 is separated by filtration.

All of these steps are represented in FIG. 2 under that part of the diagram titled "Alkaline Attack Liquor".

The process according to the invention may be applied with equal success to the alcaline uranium-bearing solutions, particularly carbonated of uranium re-extraction from an organic phase, itself charged with uranium, this phase having itself been obtained by contact particularly at counter-current with an acid lixiviation solution, particularly with undiluted sulfuric acid, of uranium-bearing concentrates.

Such a lixiviation solution results from acid treatment at a pH of around 2, preferably with the aid of sulfuric acid, for example, of uranium-bearing concentrates, during the course of which the uranium as well as the other elements are re-dissolved.

To give an example, for a uranium-bearing re-extraction solution, in which the uranium is in the form of uranyl ammonium tricarbonate, thermal de-complexing may be effected by heating to a temperature of arond 90° C. to eliminate $NH_3$ and $CO_2$. Then the pH of the solution is adjusted to a value of 2.5–3 using an acid, particularly sulfuric and heating the solution to a temperature of around 30° to around 60° C., particularly from around 40° to 60° C., to selectively precipitate the zirconium as indicated above.

The steps for the re-recovery of the uranium and the re-dissolution of the zirconium precipitate are similar to those developed relative to the treatment of alkaline attack solutions.

The steps of this embodiment of the process according to the invention are represented on FIG. 2 in the diagram figuring under the title "Eluate-Uranyl Ammonium Tricarbonate".

When the uranium-bearing re-extraction solution contains uranium in the form of uranyl sodium tricarbonate or uranyl sulfate, the solution may be acidified to a pH of 2.5–3 at the temperature of around 30° to around 60° C., particularly from around 40° C. to around 60° C. which permits both the elimination of the $CO_2$ and the selective precipitation of the zirconium as indicated above.

The acidification may be effectuated with the aid of acid, particularly sulfuric.

The steps in the precipitation of uranium as well as of the redissolution of zirconium are similar to those developed à propos of the treatment of alkaline attack solutions.

Figure 3:
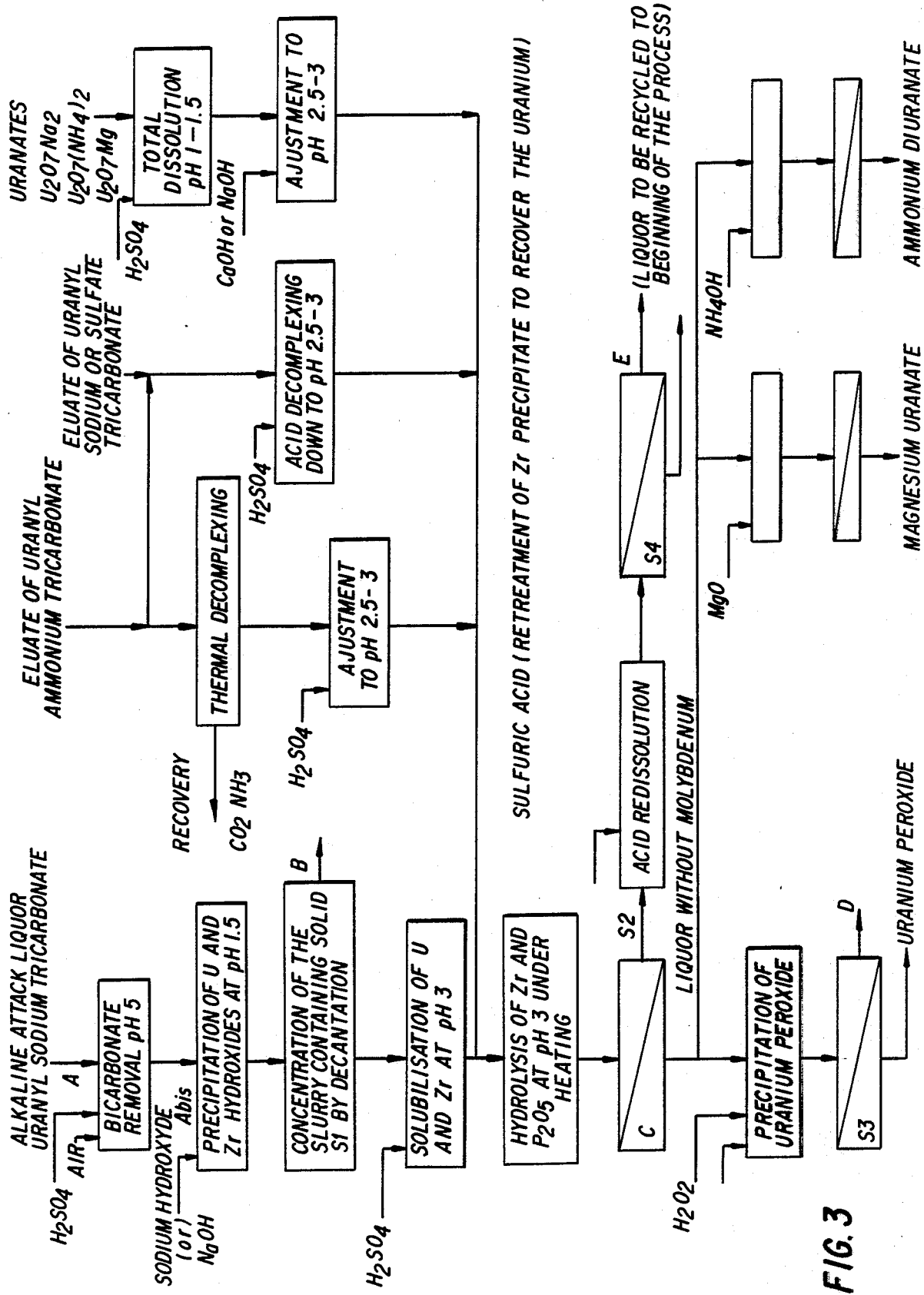
FIG. 3 is a flow diagram of the steps of an embodiment of the invention, as further set forth below.

The steps of this embodiment of the process according to the invention are represented on FIG. 3 in the part under the title "Eluate-Uranyl Sodium Tricarbonate".

When the uranium to be decontaminated is in the form of a uranate, particularly sodium diuranate ($U_2O_7Na_2$), ammonium diuranate ($U_2O_7(NH_4)_2$) or magnesium uranate ($U_2O_7Mg$), the uranate is dissolved by bringing the pH of the solution to the value of 2.5–3 with the aid of acid, notably sulfuric and heating the solution to the temperature of around 30° to around 60° C., particularly from around 40° to around 60° C., to precipitate the zirconium as indicated above.

When the uranate to be decontaminated is difficult to dissolve, for example in the case of magnesium uranate, it is advantageous to have recourse to an acidification to pH 1–1.5, with the aid of an acid, notably sulfuric. The pH of the solution, is adjusted and maintained at the value of 2.5 to 3 by the addition of a base, $Ca(OH)_2$, or preferably NaOH, and the solution is heated to the temperature of around 30° to around 60° C., particularly from around 40° to around 60° C. to precipitate the zirconium as indicated above.

The steps of the embodiment of the process according to the invention are represented on the FIG. 3 in the diagram figuring under the title "Uranates".

The steps ulterior to the precipitation of uranium as well as of the re-dissolution of the zirconium precipitate are similar to those indicated à propos of the treatment of alkaline attack solutions.

The particular examples which follow have been carried out to illustrate the process according to the invention which has been described above.

EXAMPLE 1

A liquor A is treated by the process according to the invention; it has a volume of around a few tens of liters to 1 m³ and is of the following composition:

| | |
|---|---|
| U | 2.82 g/l |
| Mo | 59 mg/l |
| Zr | 71 mg/l |
| total organic carbon | 1 200 mg/l |
| $SO_4^-$ | 10 to 100 g/l |
| $CO_3^-$ and $HCO_3^-$ expressed as $CO_2$ | 0 to 60 g/l |
| $Na^+$ | 0 to 40 g/l. |

The solution Abis resulting from bicarbonate removal has the following composition:

| | |
|---|---|
| U | = 2.82 g/l |
| Mo | = 0.059 g/l |
| Zr | = 0.071 g/l |
| total organic carbon | = 0.230 g/l |
| $CO_2$ | = 0.080 g/l |

After precipitation of the uranium and of the zirconium at pH 11.7 by addition of 0.45 kg of NaOH per kg of uranium, a slurry is obtained containing a solid S1 and a solution B, the compositions of the precipitate S1 and of the effluent solution B being, respectively, the following:

| Solid S1 | |
|---|---|
| U | = 70% by weight |
| Zr | = 1.12% by weight |
| total organic carbon | = 0.44% by weight | the complement to 100% being consituted by impurities of impregnation, in particular, $Na_2SO_4$ and $SiO_2$.

| Solution B | |
|---|---|
| U | = 1 mg/l |
| Mo | = 0.059 g/l |
| Zr less than | 0.01 g/l |
| total organic carbon | = 0.227 g/l |

After redissolution of the thickened slurry of precipitate S1 with sulfuric acid at pH3 leads to solution C and precipitate S2, composed partly of the filtration support, which is composed essentially of a product based on $SiO_2$.

The composition of precipitate S2 is the following:

| Solid S2 | |
|---|---|
| U | = 14% |
| Zr | = 8.30% |
| Mo | = 0.4% |
| total organic carbon | = 4.30% |

The solution C, concentrated in uranium, has the following composition:

| Solution C | |
|---|---|
| U | = 44 g/l |
| Mo | = 0.069 g/l |
| Zr less than | 0.01 g/l |
| total organic carbon | = 0.18 g/l |

Uranium peroxide is precipitated from this solution C and after liquid-solid precipitation, solid S3, rich in uranium, and effluent solution D are obtained.

The respective composition of solid S3 and solution D are the following:

| Solid S3 | |
|---|---|
| U (from $UO_4$) | = 70.26% |
| Mo less than | 0.011% |
| Zr less than | 0.025% |
| total organic carbon | = 0.04% |

| Solution D | |
|---|---|
| U | = 0.040 g/l |
| Mo | = 0.065 g/l |
| Zr | = — |
| total organic carbon | = 0.20 g/l |

By retreating the precipitated solid S2, obtained as indicated above and having above mentioned composition, using sulfuric acid to a pH of 1.5 to 2.5, the uranium retained in the zirconium precipitate, is dissolved. This leads then to an effluent solution E and a residue solid S4 whose compositions respectively are:

| Solution E | |
|---|---|
| U | = 62.3 g/l |
| Zr | = 0.46 g/l |
| Mo | = 0.55 g/l |
| total organic carbon | = 0.36 g/l |

| Solid S4 | |
|---|---|
| U | = 0.53% |
| Zr | = 7.03% |
| Mo | = 0.46% |

-continued

| Solid S4 | |
|---|---|
| total organic carbon | = 5.88% |

It should be noted that the complements to 100% respectively of solid S2 and solid S4 are constituted of the filtration support.

EXAMPLE 2

It is carried out like example 1. Hereafter are given the levels of the constituents of the initial solution and the levels relative to the uranium, of the constituents of the uranium-bearing concentrates obtained, expressed in percentage by weight.

Initial solution (before bicarbonate removal):

| | |
|---|---|
| U | = 2.82 g/l |
| Mo | = 0.06 g/l |
| Zr | = 0.071 g/l |
| total organic carbon | = 0.72 g/l |
| $Na^+$ | = 17.4 g/l |
| $SO_4^-$ | = 17.8 g/l |
| $SiO_2$ | = <50 mg/l |
| $CO_3^-$ and $HCO_3^-$ expressed as $CO_2$ | = 16 g/l |

After having effected five trials of the process according to the invention, on the initial solution as defiened above, uranium-bearing concentrates of the following composition were obtained (expressed in % in weight):

| Experiment: | 1 | 2 | 3 | 4 | 5 |
|---|---|---|---|---|---|
| U | 69.47 | 69.45 | 69.43 | 70.13 | 70.12 |
| Mo/U | <0.015 | <0.015 | <0.015 | <0.015 | <0.015 |
| Zr/U | 0.13 | 0.13 | 0.13 | 0.13 | 0.14 |
| tot. org. carbon/U | 0.14 | 0.020 | 0.08 | 0.07 | 0.06 |
| Na/U | 0.23 | 0.17 | 0.13 | 0.10 | 0.14 |
| $SO_4$/U | 0.26 | 0.20 | 0.13 | 0.20 | 0.20 |
| $SiO_2$/U | 0.10 | 0.10 | 0.10 | 0.10 | 0.10 |

The process according to the invention permits to obtain uranium of high purity in which the maximum of zirconium about 0.2%.

COMPARATIVE EXAMPLES 1, 2, 3, 4 AND 5.

Each experiment has been carried out from a liquor A, which after bicarbonate rmoval, gives a liquor A bis.

Such liquor A bis, after precipitation of the uranium and of the zirconium enables to remove the molybdenum, and leads to a slurry constituted by a solid S1 and an effluent B, said slurry having the following characteristics:

| | |
|---|---|
| specific gravity: | 1,124 |
| humidity: | 88,70% |
| analysis (of solid S1): | U = 58,7% |
| | Zr = 0,51% |
| | Mo = 0,042% |
| | So4 = 4,83% |

This slurry containing the solid S1 is dissolved with sulfuric acid at different pH and different temperatures, and this leads to a solution C, concentrated in uranium, whereas zirconium precipitates.

For each experiment, the composition of the solution C which is obtained is hereafter given, as well as the elimination rate of Zr (with respect to the content of Zr in the solid S1) and the loss rate of U (with respect to the content of U in the solid S1).

Four experiments (1, 2, 3, 4 and 5) have been carried out at a given temperature of 45° C. and at different pH, respectively of 2, 2,5, 3, 3,5 and 4 in order to point out the influence of pH inside and outside the pH range used in the process of the invention.

| Experiment | | 1 | 2 | 3 | 4 | 5 |
|---|---|---|---|---|---|---|
| pH Analysis of solution C | | 2 | 2.5 | 3 | 3.5 | 4 |
| U | g/l | 75,51 | 74,80 | 75,00 | 72,15 | 70,43 |
| Zr | mg/l | 103 | 12 | <10 | <10 | <10 |
| Mo | mg/l | 121 | 124 | 145 | 147 | 141 |
| TOC | mg/l | 233 | 224 | 235 | 239 | 232 |
| $SO_4$ | g/l | 98,64 | 94,52 | 94,40 | 92,72 | 87,61 |
| Loss of U % (with respect to solid S1) | | 0,2 | 0,3 | 1,1 | 4,5 | 8,7 |
| Elimination of Zr % (with respect to solid S1) | | 84,6 | 98,2 | 98,5 | 98,6 | 98,5 |

*TOC: Total organic carbon

These results show that in the pH range, of the process of the invention, for a given temperature situated in the range of the process of the invention, there is an optimum elimination of Zr and a minimum loss of U.

At a pH higher than 3, there is an increase in U, loss which implies additional retreatment steps, complicating the process on an industrial scale, and at a pH lower than 2.5 the elimination of Zr decreases (about 15% less of eliminated zirconium at pH 2 than at pH 2.5).

We claim:

1. A process for selectively removing zirconium from an aqueous uranium-containing solution, in which the weight ratio of uranium to zirconium is at least about 25; said process comprising the step of:
    providing said solution with a pH of 2.5 to 3 and heating said solution to a temperature of about 30° C. to 60° C., whereby zirconium selectively precipitates from said solution.

2. The process of claim 1, wherein phosphorous is also present in said solution and also precipitates from said solution while heating said solution.

3. The process of claim 1, wherein said solution is heated to about 40° to 60° C. and provided with a pH of 2.5 to 3 for a period of time sufficient to precipitate at least about 70% of the zirconium in said solution.

4. The process of claim 1, wherein said solution is provided with a pH of 2.5 to 3 by adding a base.

5. The process of claim 4, wherin said base is sodium hydroxide.

6. The process of claim 1, comprising heating said solution to about 30° to 60° C. for about 2 to 4 hours.

7. The process of claim 6, comprising heating said solution to about 50° C. for about 2 hours.

8. The process of claim 1, wherein said solution is provided with a pH of 2.5 to 3 by adding an acid to provide a pH of 1 to 1.5 and then adding a base to provide a pH of 2.5 to 3.

9. The process of claim 1, wherein said solution, before zirconium is removed therefrom, comprises:
    about 30 to 80 g/l of uranium,
    about 1 to 3 g/l of zirconium and
    about 10 to 50 g/l of sulfate ions.

10. The process of claim 1, wherein said solution, before zirconium is removed therefrom, comprises:
    about 40 to 60 g/l of uranium and about 1.5 to 2 g/l of zirconium.

11. The process of claim 1, wherein said solution has a pH of 1 to 3 before precipitating zirconium; and wherein said solution is provided with a pH of 2.5 to 3 by adding a base and is heated to a temperature of about 30° to 60° C. for a length of time sufficient for there to be a selective preciptation of at least 70% of the total quantity of zirconium from said solutio while uranium remains in said solution.

12. The process of claim 11, wherein said solution is heated to a temperature of about 40° to 60° C. while said solution is provided with a pH of 2.5 to 3 for a length of time sufficient for there to be selective precipitation of at least 90% of the total quantity of zirconium from said solution while uranium remains in said solution.

13. The process of claim 1, wherein said solution contains uranium and zirconium that had been:
(a) selectively precipitated from an aqueous molybdenum-containing solution, also containing uranium and zirconium, by providing a pH of about 11.5 to 11.8 in said molybdenum-containing solution; and then
(b) dissolved in an aqueous acid having a pH of about 1 to 1.5.

14. The process of claim 13, wherein said molybdenum-containing solution is provided with a pH of about 11.5 to 11.8 by adding a base.

15. The process of claim 13, wherein before selectively precipitating uranium and zirconium from said molybdenum-containing solution, bicarbonate is selectively removed from said molybdenum-containing solution by providing said molybdenum-containing solution with a pH of about 4.5 to 5.2.

16. The process of claim 15, wherein said molybdenum-containing solution is provided with a pH of about 4.5 to 5.2 by adding an acid.

17. The process of claim 16, which includes the additional step of treating said uranium-containing solution, after removal of zirconium therefrom, with hydrogen peroxide to precipitate uranium as uranium peroxide.

18. The process of claim 15, wherein said molybdenum-containing solution, before precipitating bicarbonate, uranium and zirconium therefrom, comprises:
about 1 to 5 g/l uranium,
about 50 to 500 mg/l molybdenum,
about 40 to 100 mg/l zirconium and
about 10 to 20 g/l bicarbonate.

19. The process of claim 2, wherein said uranium-containing solution, before precipitating zirconium therefrom, comprises:
about 30 to 80 g/l uranium,
about 1 to 3 g/l zirconium and
about 0 to 1 g/l phosphorous.

20. The process of claim 19, wherein said uranium-containing solution, before precipitating zirconium therefrom, comprises:
about 40 to 60 g/l uranium and
about 1.5 to 2 g/l zirconium.

21. The process of claim 8, wherein said acid is sulfuric acid and said base is sodium hydroxide.

* * * * *